Oct. 10, 1933.  A. C. BADGER  1,929,401

EXPANSION JOINT

Original Filed March 27, 1929

Inventor:
Arthur C. Badger.
by Wright, Brown, Quinby & May
Att'ys.

Patented Oct. 10, 1933

1,929,401

UNITED STATES PATENT OFFICE 1,929,401

EXPANSION JOINT

Arthur C. Badger, Newton, Mass.

Application March 27, 1929, Serial No. 350,309
Renewed May 27, 1933

10 Claims. (Cl. 285—90)

The present invention relates to so-called expansion joints for pipes, these being short lengths of pipe, or couplings, which are capable of being lengthened or shortened in the axial direction and are designed for connection between ends of rigid pipe sections to permit expansion and contraction of such sections by temperature changes, without injury. The object is to provide an expansion joint of this character, and more particularly of the corrugated type, which will stand subjection to high temperatures and pressures without injury, will permit a wide range of expansile and contractile movement in proportion to the number of corrugations, and is equipped with means to prevent permanent deformation of the corrugations when the joint is excessively contracted by expansion of the connected pipe sections.

The invention consists in an expansion joint having the novel features and characteristics hereinafter described and claimed in connection with illustration of one of its possible embodiments.

In the drawing furnished herewith,—

Figure 1:
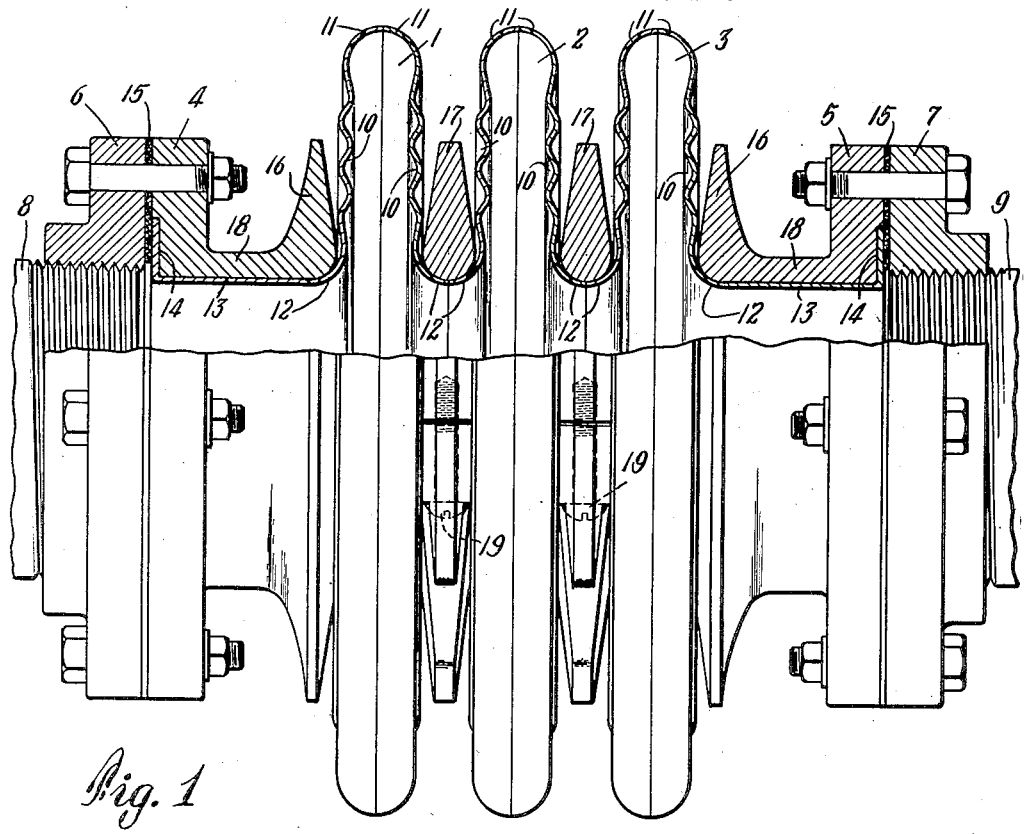
Fig. 1 is an elevation, partially broken away and shown in section, of an expansion joint embodying this invention.

The expansion joint of this invention is formed with any desired number of corrugations 1, 2 and 3, and with end flanges 4 and 5 adapted to be secured to complemental flanges 6 and 7 respectively on pipe sections 8 and 9 between which the expansion joint is interposed. The corrugations are made with exceptionally great depth radially of the pipe and with exceptionally great strength and refractory quality to resist pressure and withstand the effects of high temperature, in comparison with the expansion joints formed of corrugated seamless tubing heretofore generally used. Thus the present joint is particularly adapted for insertion in pipe lines designed to convey high pressure and superheated steam.

To obtain these qualities, the corrugated portion of the joint is built up of annular plates or disks 10, duplicates of one another, each of which is formed with a flange 11 at its outer circumference directed toward one side, and with a flange 12 at the inner circumference directed toward the other side. Otherwise the disks may be entirely plane, but they are preferably formed with circular concentric ridges and depressions, as shown in the drawing, to increase their elastic flexibility.

The flanges 11 and 12 have a toric curvature and extend through approximately 90° of arc from the plane of the disk. A succession of disks thus formed are assembled together face to face and back to back so that the outer flanges of each pair of disks abut against one another to form the ridges of the corrugations, while the inner flange on one of such pairs abuts against the inner flange of the next pair to form the bottoms of the grooves or valleys between the corrugations. The flanges thus abutting are welded together, preferably by electric welding, so that the disks are joined in a single unitary structure of homogeneous character. They are made of an intrinsically strong and tough weldable metal or alloy, such as iron, any of the suitable steels or steel alloys, German silver, etc., and may have any thickness sufficient to prevent rupture under the pressures to which the expansion joint is intended to be subjected. This construction enables the corrugations to be made of any desired depth radially of the joint.

The inner flanges at the ends of this unitary collection of disks are secured to the end flanges to complete the joint. The conditions under which these structures are used require the flanges 4 and 5 to be rigid and rugged. They are preferably made therefore of cast iron, and in order that the necessary tight union may be effected between the corrugations and the flanged ends of the joint, tubes 13 of the same material as the disks are assembled as lining sleeves within the coupling flanges and are butt welded to the interior flanges of the endmost disks. Such lining sleeves or tubes have out-turned flanges or lips 14 on their ends which overlap the end flanges of the attaching faces and the gaskets 15 which are inserted between such flanges and the adjacent pipe section flanges, so as to make leakage tight joints and prevent the lining sleeves from being pulled out of the attaching flanges. Also the latter are preferably recessed on their end faces to receive the outturned lips of the lining sleeves.

Figure 2:
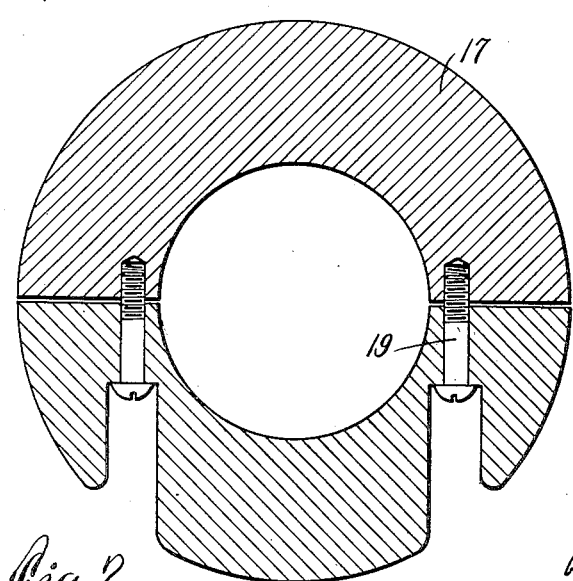
Fig. 2 is a cross section of one of the rings by which shortening of the expansion joint is limited and permanent deformation of the corrugations is prevented.
Figure 3:
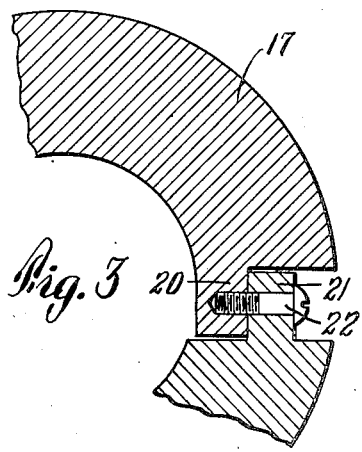
Fig. 3 is a partial section of a similar ring having a different means for connecting its constituent parts together.

The expansion joint thus made is designed to be connected with adjacent pipe sections in the undistorted condition shown in the drawing. It takes substantially this condition and form whenever the pipe line is cold. It may be shortened by expansion of the adjacent pipe sections until the inner bends or valleys come together. In order to prevent further collapse and distortion of the joint beyond the stage last indicated, I provide abutment shoulders 16 in rigid engagement with the end flange fittings and equivalent abutment rings 17 in the valleys between the corrugations. Preferably the abutment shoulder is integral with the adjacent end flange, 4 or 5 respectively, and is spaced apart therefrom by an intermediate sleeve portion 18 of great enough length to furnish room for the insertion of bolts, or application of nuts to such bolts, by which the flange of the expansion joint is connected to the flange of the adjacent pipe section. The intermediate rings are independent and are separately placed in the valleys. To permit their placement and removal they are preferably made in two parts to fit together on a diametral plane and are secured by screws 19 passed through countersunk holes in one of the sections and screwed into tapped holes in the other, as shown in Fig. 2. However, the sections may be provided with overlapping lugs 20 and 21 connected by a screw 22, as shown in Fig. 3; or may be made in any other desired way.

All of said abutments are fitted to the valleys of the pipe corrugations both with respect to the radius of curvature thereof around the axis of the pipe and to the curvature thereof longitudinally of the pipe, that is, their toric curvature. Their sides adjacent to the several disks are conical or beveled to a degree which corresponds to the inclinations of the sides of the disks when the valleys are brought together. At such times the ridges of adjacent corrugations likewise come into contact with one another or nearly so. In shortening or collapse of the joint by external force applied to its ends (as by expansion of the connected rigid pipe sections 8 and 9), the walls of the corrugations are flexed around the inner toric curves of the abutments into contact with the sides of the abutments until, when such shortening has proceeded to the limit, there is continuous uninterrupted contact of the bottom and adjacent side walls of the several valleys with the contiguous parts of the respective abutments from the inner circumference thereof outwardly. When the disks are made with annular offset ridges, as shown, there is such contact at the tops of the ridges and the contact is continuous and uninterrupted, even over the rigid area, in the sense that all the ridges between the inner and outer circumferences of the abutments make contact. Thus the abutments not only furnish solid masses which prevent the valley curves from being distorted, but their sides also support and reinforce the sides of the corrugations preventing them from being excessively distorted, either by pressure imposed by the connected pipe sections or by the pressure of the confined steam or other fluid. Such abutments may, if desired, be extended outward until their opposite faces meet, but for most purposes it is sufficient that they extend substantially as far as shown in the drawing.

When the joint is collapsed by expansion of the pipe sections with which it is connected, the bottoms or valleys of the corrugations are sustained against change of shape by the abutment rings, which substantially fill them; and the side walls are flexed gradually around the rings, in the course of the collapsing movement, until the limit of such movement is reached. Owing to the great depth of the corrugations, (as shown, they are deeper than the distance in the axial direction between the centers of adjacent corrugations), these side walls may be substantially perpendicular to the axis of the joint when in the unstressed or uncollapsed condition, and they are very flexible and able to distribute over their radial width all the distortion due to shortening and lengthening of the joint as a whole, without stressing seriously the valley or ridge curves of the corrugations. Such flexibility is enhanced by the concentric ridges and grooves (secondary corrugations) shown in the drawing; but even when the walls are uncorrugated, as they may be within the scope of the invention, they are still flexible enough for the purposes above indicated.

Instead of making the abutments 16 integral with the end flanges, they also may be made as separate rings like the rings 17, if desired, seated detachably in the recess between the endmost disk and the sleeve portion 18.

An expansion joint constructed as herein described, or with equivalent characteristics, may be made relatively short by reason of the great depth and flexibility of the corrugations, while affording ample capacity for expansion of the connected pipe sections. Its construction permits use of strong metal sufficiently thick to confine the highest steam pressures without danger of bursting or being stretched beyond the elastic limit, and metal moreover which is not softened appreciably by the temperature of high pressure superheated steam. Finally, it may be made at relatively very low cost.

Considering the tubes 13 as parts of the expansion unit rather than of the flange fittings, it is apparent that this expansion joint comprises homogeneous integral corrugations and tubular ends, with reinforcing sleeves or tubes and abutments, and end attaching flanges; the former furnishing the flexibility necessary for expansion of adjoining pipe sections and impermeability against leakage, while the reinforcing means prevents damage by excessive expansion of the adjoining sections.

What I claim and desire to secure by Letters Patent is:

1. An expansion joint for pipe lines comprising end fittings, intermediate corrugations, and abutments on said fittings and between said corrugations having an interior curvature fitting the valleys of the corrugations and beveled sides conforming substantially to the inclination of the sides of said corrugations when said valley portions are brought together.

2. An expansion joint for pipe lines comprising a tubular bellows structure having annular ridges and an intermediate valley of smooth continuous curvature in profile, and an abutment ring occupying said valley and surrounding that part of the joint, said ring having a cross section at and adjacent to its inner circumference conforming in dimensions and shape approximately to the profile of the valley bottom and having its sides converging toward the outer circumference in substantial conformity to the inclination of the walls of the valley when the ridges are brought together by shortening of the joint.

3. An expansion joint for pipe lines comprising a tubular bellows structure having annular ridges and an intermediate valley of smooth continuous curvature in profile, and an abutment ring occupying said valley and surrounding that part of the joint, said ring being of smaller outside diameter than said ridges and having a cross section at and adjacent to its inner circumference conforming in dimensions and shape approximately to the profile of the valley bottom and having its sides converging toward the outer circumference in substantial conformity to the inclination of the walls of the valley when the ridges are brought toward one another by shortening of the joint.

4. In a corrugated expansion joint, an abutment ring adapted to occupy the groove or valley between two corrugations, said ring being constructed of a plurality of separable parts having overlapping lugs, and a fastening screw passing through the outer of said lugs into threaded engagement with the inner adjacent lug and having its head sunk within the outer circumference of the ring.

5. An expansion joint for pipe lines comprising a tubular corrugated structure having a valley between flanking ridges or corrugations deeper than the center distance between such ridges axially of the structure, such valley having a smooth toric curvature of substantial radius, and a ring occupying said valley substantially fitting and filling the bottom thereof, and having sides arranged to support, against distortion when the joint is collapsed, the side walls of such valley adjacent to the bottom thereof.

6. An expansion joint for pipe lines comprising a tubular corrugated structure having a valley between flanking ridges or corrugations, such valley having a smooth toric curvature and flexible sides, combined with a ring occupying said valley substantially fitting and filling the bottom thereof, and having sides so disposed with respect to the flexible sides of the valley that the latter are adapted to make uninterrupted contact with the ring, from the inner circumference thereof outwardly along the sides, when the joint is shortened.

7. An expansion joint comprising a tubular corrugated structure having a valley or groove with flexible sides and toric curvature at its bottom, and a ring occupying said valley having an inner diameter equal to the diameter of the valley bottom and a toric curvature approximately equal to that of the valley bottom when the tubular structure is in its normal unstressed condition, the side faces of said ring extending in smooth continuity with the inner curvature thereof; the arrangement being such that when the joint is shortened the bottom of the valley and adjacent portions of the side walls will make contact with the corresponding parts of the ring.

8. An expansion joint for pipe lines comprising a tubular bellows structure having annular ridges and an intermediate valley with smooth continuous curvature in profile, and an abutment ring occupying said valley and substantially fitting the bottom thereof, said ring having a cross section at and adjacent to its inner circumference conforming in dimensions and shape to the profile of the corresponding part of the valley occupied thereby when the joint is shortened to the limit.

9. An expansion joint for pipe lines comprising a tubular bellows structure having annular ridges and an intermediate valley of smooth continuous curvature in profile with connecting walls substantially perpendicular to the axis of the joint when the latter is in its normal unstressed condition, an abutment ring occupying said valley and external abutments beside the outermost side walls of the bellows structure, said ring and abutments having side faces which conform to the inclination of the contiguous side walls of the corrugations when the joint is shortened to the limit, the ring being of smaller outside diameter than the annular ridges, whereby in shortening of the joint the corrugations are adapted to come into contact with one another at both top and bottom.

10. An expansion joint for pipe lines comprising end fittings, intermediate corrugations, and abutments on said end fittings and between said corrugations having an interior curvature fitting and filling the valley bottoms of the corrugations and having sides in contact with the tops of all the after-mentioned ridges which lie within the outer circumferences of the abutments when the joint is shortened to its limit of shortening; the sides of the corrugations being provided with oppositely offset, annular ridges and grooves for enhancement of flexibility.

ARTHUR C. BADGER.